United States Patent [19]

Yamauchi

[11] Patent Number: 4,805,953
[45] Date of Patent: Feb. 21, 1989

[54] FOLDABLE SEAT FOR MOTOR VEHICLE

[75] Inventor: Yoshihiko Yamauchi, Kanagawa Prefecture, Japan

[73] Assignee: Ikeda Bussan Co., Ltd., Ayase, Japan

[21] Appl. No.: 139,828

[22] Filed: Dec. 30, 1987

[30] Foreign Application Priority Data

Mar. 30, 1987 [JP] Japan .............................. 62-47299[U]

[51] Int. Cl.⁴ .............................................. B60N 1/02
[52] U.S. Cl. .................................... 296/65.1; 297/378; 297/379
[58] Field of Search ............. 296/65 R; 297/341, 378, 297/383, 379, 355

[56] References Cited

U.S. PATENT DOCUMENTS

| | | | |
|---|---|---|---|
| 4,206,946 | 6/1980 | Maertens | 297/379 |
| 4,286,819 | 9/1981 | Inoue et al. | 296/65 R |
| 4,368,916 | 1/1983 | Blasin | 296/65 R |
| 4,484,776 | 11/1984 | Gokimoto et al. | 296/65 R |
| 4,512,609 | 4/1985 | Pärsson | 296/65 R |

Primary Examiner—Robert R. Song
Attorney, Agent, or Firm—Foley & Lardner, Schwartz, Jeffery, Schwaab, Mack, Blumenthal & Evans

[57] ABSTRACT

Herein disclosed is a foldable seat for motor vehicles, in which a seatback of the seat can be folded on a seat cushion having a back surface of the seatback laid substantially flush with a flat floor of a luggage space. The foldable seat comprises a front frame structure pivotally connected to the floor, a pair of rear brackets secured to the floor at positions behind the front frame structure, a pair of hinge arms secured to the seatback and pivotally connected to the rear brackets, a pair of first links pivotally connected at their one ends to the hinge arms, a pair of second links pivotally connected at their one ends to the other ends of the first links and pivotally connected to at their other ends to the rear brackets, respectively, a rear frame structure extending between the second links and secured thereto, and a cushion supporter extending between the front and rear frame structures and supporting thereon the seat cushion.

7 Claims, 2 Drawing Sheets

FOLDABLE SEAT FOR MOTOR VEHICLE

BACKGROUND OF THE INVENTION

1. Field of the Invention

The present invention relates in general to foldable seats for a motor vehicle, and more particularly to foldable seats of a type in which a seatback is inclinable forward to be folded on a seat cushion.

2. Description of the Prior Art

In automobiles for commercial use (such as a van or station wogon), a so-called "foldable seat" is usually employed as a rear seat for obtaining larger luggage space when the vehicle is used as a luggage carrier. Upon requirement of larger luggage space, the seatback of the seat is inclined forward and folded on the seat cushion. With this, the space defined above the folded seat can be used as an extra luggage space.

One of the conventional foldable seats is shown in FIG. 4A, which comprises a seat cushion A mounted on a floor of a motor vehicle, a seatback C pivotally connected to the seat cushion A, and a known latch mechansim arranged between the seat cushion A and the seatback C for locking the seatback C at a given raised position. Usually, each of the seat cushion A and the seatback C is constructed to have a swelled front surface B in order to give a comfortable sitting to a seat occupant.

However, as is seen from FIG. 4B, the swelled construction inevitably brings about such a drawback that when the seatback C is folded, the back surface D of the folded seatback C becomes inclined. As is known, presence of such inclined surface on a luggage space floor makes loading of luggage thereon difficult or at least troublesome.

SUMMARY OF THE INVENTION

It is therefore an object of the present invention to provide an improved foldable seat for a motor vehicle, which is free of the above-mentioned drawback.

According to the present invention, there is provided a foldable seat which, when folded, provides the folded seatback with a back surface which is substantially flush with the floor of the luggage space.

According to the present invention, there is provided a foldable seat having a seat cushion and a seatback and mounted on a floor. The foldable seat comprises a pair of front brackets secured to the floor; a front frame structure including two leg portions pivotally connected to the paired front brackets and a front frame proper; a pair of rear brackets secured to the floor at positions behind the front brackets; a pair of hinge arms secured to the seatback and pivotally connected to the paired rear brackets; a pair of first links pivotally connected at their one ends to the hinge arms; a pair of second links pivotally connected at their one ends to the other ends of the first links and pivotally connected at their other ends to the rear brackets; a rear frame structure extending between the second links and secured thereto; and a cushion supporter extending between the front and rear frame structures and resiliently supporting thereon the seat cushion.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
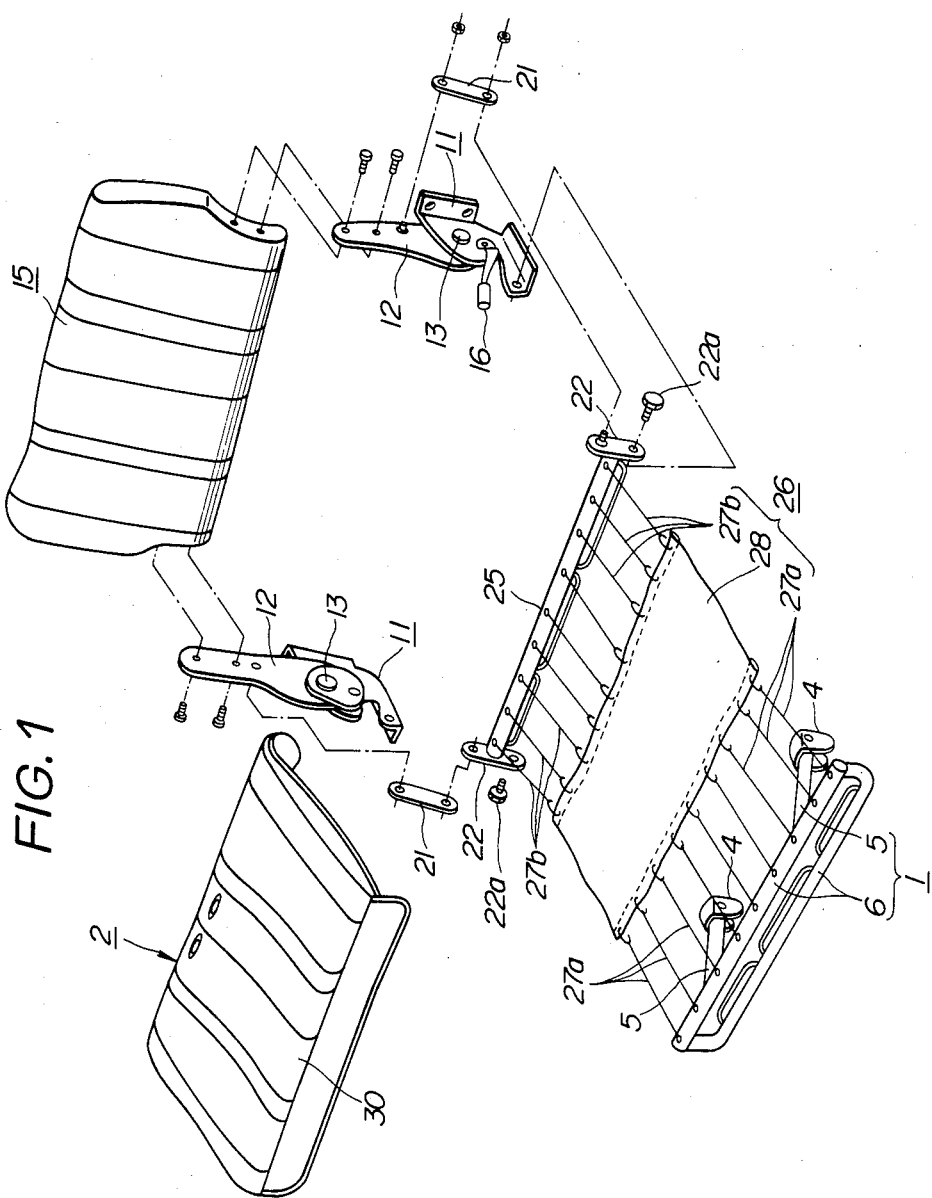
FIG. 1 is an exploded view of a foldable seat for a motor vehicle, according to the present invention.
Figure 2:
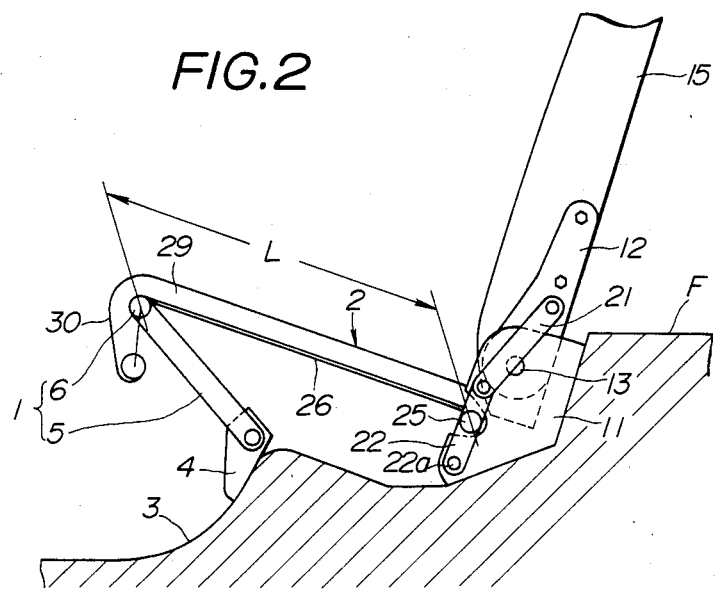
FIG. 2 is a side view of the foldable seat of the invention, showing a condition wherein the seat is in use.
Figure 3:
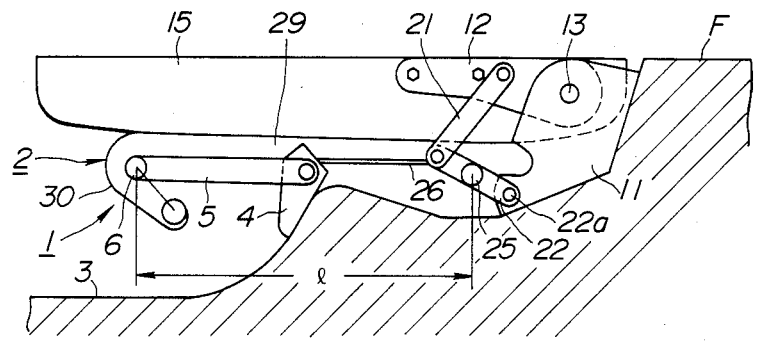
FIG. 3 is a side view of the foldable seat, showing a condition wherein the seatback is folded.
Figure 4A:
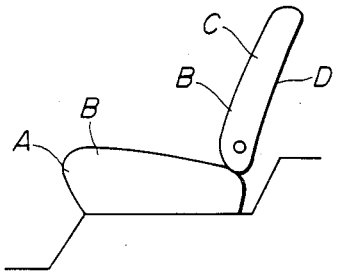
FIG. 4A is a side view of a conventional foldable seat which has been described hereinabove.
Figure 4B:
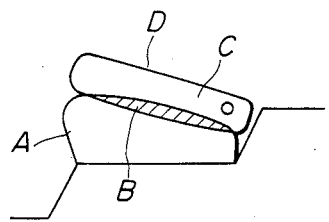
FIG. 4B is a side view of the conventional foldable seat, showing a condition wherein the seatback is folded on the seat cushion.

Referring to FIGS. 1 to 3, particularly FIG. 1, there is shown a foldable seat of the present invention. As is understood from FIG. 2, the foldable seat is mounted on a recessed part 3 of a vehicle floor.

In the drawings, numeral 1 denotes a front frame structure of a seat cushion 2, which comprises a frame proper 6 and two spaced supporting legs 5 and 5 each extending from the frame proper 6. As is seen from FIG. 2, each leg 5 is pivotally connected to the recessed portion 3 of the vehicle floor through a bracket 4. As will be described in detail hereinafter, the front frame structure 1 is movable or swingable between a first given position wherein, as is seen from FIG. 2, the supporting legs 5 and 5 are kept inclined slightly forward relative to a flat portion F of the vehicle floor and a second given position wherein, as is seen from FIG. 3, the supporting legs 5 and 5 are kept folded in parallel with the flat portion F of the vehicle floor.

Behind the front frame structure 1, there are arranged two spaced supporting brackets 11 which are secured to a rear part of the recessed portion 3 of the vehicle floor. Two hinge arms 12 are pivotally connected through respective pivot pins 13 and 13 to the supporting brackets 11. The arms 12 are bolted at their upper portions to lateral sides of a seatback 15, so that the seatback 15 is pivotal relative to the supporting brackets 11, that is, relative to the vehicle floor. A known latching mechanism is incorporated with one of the brackets 11, which has an operation handle 16. Upon manipulation of the handle 16, the seatback 15 is inclined to a desired angular position and locked at this position.

Two first links 21 and 21 are pivotally connected at their upper ends to the arms 12 and 12 respectively. These first links 21 and 21 have lower ends to which upper ends of two second links 22 and 22 are pivotally connected. The second links 22 and 22 are pivotally connected at their lower ends to the supporting brackets 11 and 11 through pivot pins 22a and 22a. A rear frame 25 extends between the second links 22 and 22 and is secured thereto.

As is seen from FIG. 1, between the front frame proper 6 and the rear frame 25, there is expanded a cushion supporter 26 which comprises front wire springs 27a, an expandable sheet 28 and rear wire springs 27b which are assembled in the illustrated manner. If desired, a plurality of coiled springs or S-shaped springs may be used in place of the disclosed supporter 26.

On the cushion supporter 26, there is mounted a pad material 29 (see FIG. 2) which is covered with an outer skin 30 of the seat cushion 2. Front and rear edges of the outer skin 30 are trimmed with respect to the frames 6 and 25. If desired, a suitable o insulator may be put in between the cushion supporter 26 and the pad material 29 in order to provide a seat occupant with a more comforable sitting feeling.

In the following, operation of the foldable seat of the invention will be described with reference to FIGS. 2 and 3. For ease of understanding, the description will be commenced with respect to the in-use condition of the seat as shown in FIG. 2 wherein the seatback 15 is locked at a certain angular position by the work of the latching mechanism associated therewith.

Under this in-use condition, the front frame structure 1 assumes the first given position and the second links 22 and 22 fixed to the rear frame 25 are somewhat inclined rearward, so that the seat cushion 2 is inclined with the upper surface thereof sloping downward. Reference "L" denotes the distance between the front frame proper 6 and the rear frame 25, which distance is so determined as to apply a suitable tension to the cushion supporter 26.

When the operation handle 16 of the latching mechanism is manipulated, the locked condition of the seatback 15 becomes cancelled. Then, when, for the purpose of folding the seatback 15, the same is pushed forward, the hinge arms 12 and 12 are pivoted forward about the pivot pins 13 and 13. The forward pivoting of the hinge arms brings about forward parallel movement of the first links 21 and 21 turning the second links 22 and 22 forward about the common axis of the pivot pins 22a and 22a in FIG. 2. Thus, the rear frame 25 is moved forward but slightly, and the front frame structure 1 is turned to the second given position.

Thus, when the seatback 15 is finally inclined forward, it can be neatly put on the seat cushion 2 with its back surface laid substantially flush with the flat portion "F" of the vehicle floor, as is seen from FIG. 3. The distance "l" between the front frame proper 6 and the rear frame 25 defined in this folded condition is smaller than the afore-mentioned distance "L", so that no tension is applied to the cushion supporter 26 rendering the latter to dangle loosely from the frame structures. Thus, the seatback 15 can be deeply folded and settled on the seat cushion 2 assuring the flush laying of the seatback 15 with respect to the flat portion "F" of the vehicle floor.

What is claimed is:

1. A foldable seat having a seat cushion and a seatback and mounted on a floor, said foldable seat comprising:
   a pair of front brackets secured to said floor;
   a front frame structure pivotally connected to the paired front brackets;
   a pair of rear brackets secured to said floor at positions behind said front brackets;
   a pair of hinge arms secured to said seatback and pivotally connected to the paired rear brackets;
   a pair of first links pivotally connected at their one ends to said hinge arms respectively;
   a pair of second links pivotally connected at their one ends to the other ends of said first links and pivotally connected at their other ends to said rear brackets respectively;
   a rear frame structure extending between said second links and secured thereto; and
   a cushion supporter extending between said front and rear frame structures and resiliently supporting thereon said seat cushion.

2. A foldable seat as claimed in claim 1, in which said cushion supporter comprises front wire springs each extending from said front frame structure, an expandable sheet having a front edge to which the other end of each front wire spring is hooked, and rear wire springs each extending from the rear frame structure and hooked to a rear edge of said expandable sheet.

3. A foldable seat as claimed in claim 2, in which said front frame structure comprises a front frame proper to which said front wire springs are connected and two spaced supporting legs extending from the front frame proper and pivotally connected at their lower ends to the paired front brackets.

4. A foldable seat as claimed in claim 3, further comprising a latching mechanism which is incorporated with one of said rear brackets in order to lock the associated hinge arm when the same and thus the seatback is pivoted to a given angular position.

5. A foldable seat as claimed in claim 4, in which said front and rear brackets are mounted on a bottom of a recessed portion of said floor.

6. A foldable seat as claimed in claim 1, in which a distance between said front and rear frame structures is varied in response to change of angular position of said seatback relative to said floor.

7. A foldable seat as claimed in claim 6, in which said distance assumes its maximum value when said seatback is raised up to assume its in-use position.

* * * * *